United States Patent

Wallace

[15] 3,640,655
[45] Feb. 8, 1972

[54] APPARATUS FOR UTILIZING HOT AND COOL GAS FOR THRUST EMBEDDING A METAL INSERT IN A BODY OF HEAT SOFTENABLE MATERIAL

[72] Inventor: Robert P. Wallace, Somers, N.Y.
[73] Assignee: Mite Corporation, Danbury, Conn.
[22] Filed: Feb. 25, 1970
[21] Appl. No.: 14,144

[52] U.S. Cl. ............................425/109, 29/212 T, 227/120, 18/6 R
[51] Int. Cl. ...........................................B29d 3/00
[58] Field of Search..................18/1 R, 2 R, 6 R; 29/212 T; 227/12 D

[56] References Cited

UNITED STATES PATENTS

| | | | |
|---|---|---|---|
| 2,500,721 | 3/1950 | Van Dijk | 227/120 |
| 2,529,863 | 11/1950 | Bowen | 18/1 R X |
| 3,172,149 | 3/1965 | Kornmayer | 18/1 R |
| 3,494,015 | 2/1970 | Eissele et al. | 29/212 T |

*Primary Examiner*—H. A. Kilby, Jr.
*Attorney*—Watson, Leavenworth & Kelton

[57] ABSTRACT

Apparatus for installing by thrust embodiment a metallic insert into a receiving body of thermoplastic material which is relatively rigid at ambient temperature by softening the thermoplastic where the insert is to be forced in as thrust is applied to the insert. The thermoplastic body is softened at this site by continuously and rapidly flowing of pressurized hot gas or air against this locality of the plastic body and the insert as the latter is progressively thrust forward. The elevated temperature of the gas or air is kept below that which will cause appreciable heat damage of the plastic. When the insert has been inserted to the desired depth it and the adjacent plastic are rapidly cooled to ambient temperature by pressurized cool gas or air which is flowed rapidly against the embedded insert and the adjacent plastic.

A tool for performing this action includes a housing that is supported in a relatively fixed position. A thrust motor, which may be of the single action spring return pneumatic type, is mounted in the housing, and the piston thereof transmits thrust to the back end of the insert by a tube which has an insert-engaging hollow tip. The tube guides flow therethrough into the hollow tip of pressurized gas or air which is heated by flowing over an electrical heating coil that is coaxially mounted in this tube, as thrust is applied by the latter to the insert. The hot pressurized gas or air raises the temperature of the insert and adjacent thermoplastic of the receiving body to that which softens the plastic for permitting thrust entry of the insert. The insert is guided during thrust by the tool, and preferably also by a pilot hole formed in the plastic body into which the nose of the insert initially is dropped. After the insert has been thrust into the softened plastic to the desired depth the softened plastic adjacent the insert is rapidly cooled by a blast of pressurized gas or air at ambient temperature which is flow guided into the hollow tip by a duct that is carried alongside of the tube so as to bypass the heating element.

7 Claims, 8 Drawing Figures

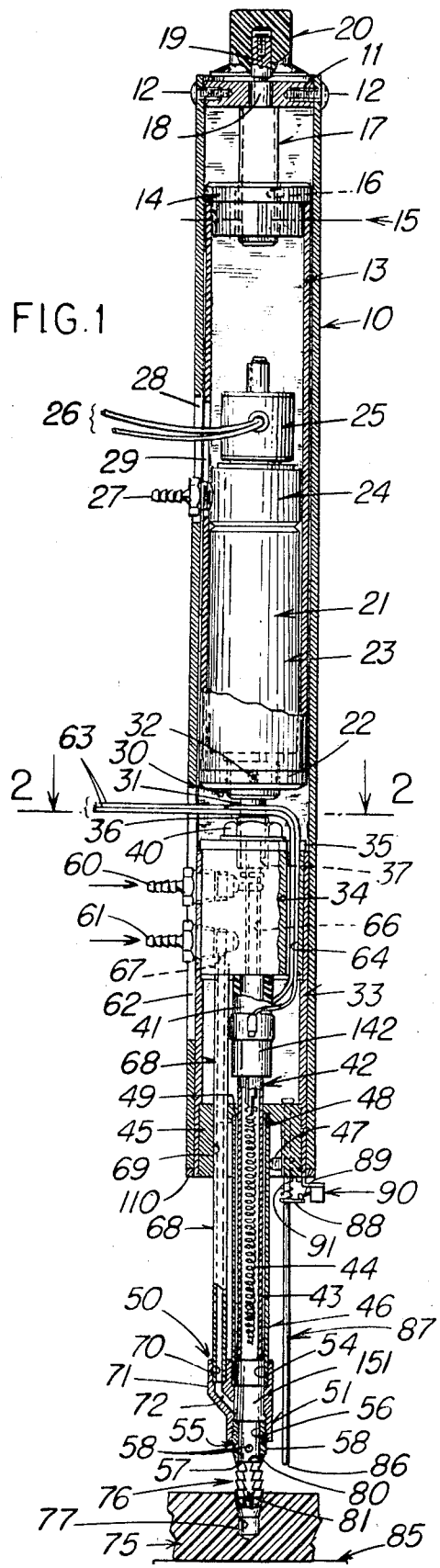
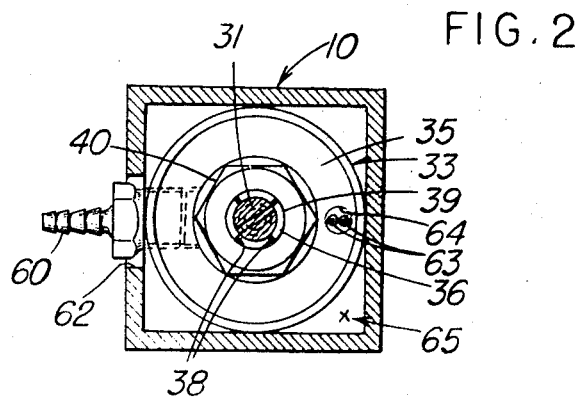
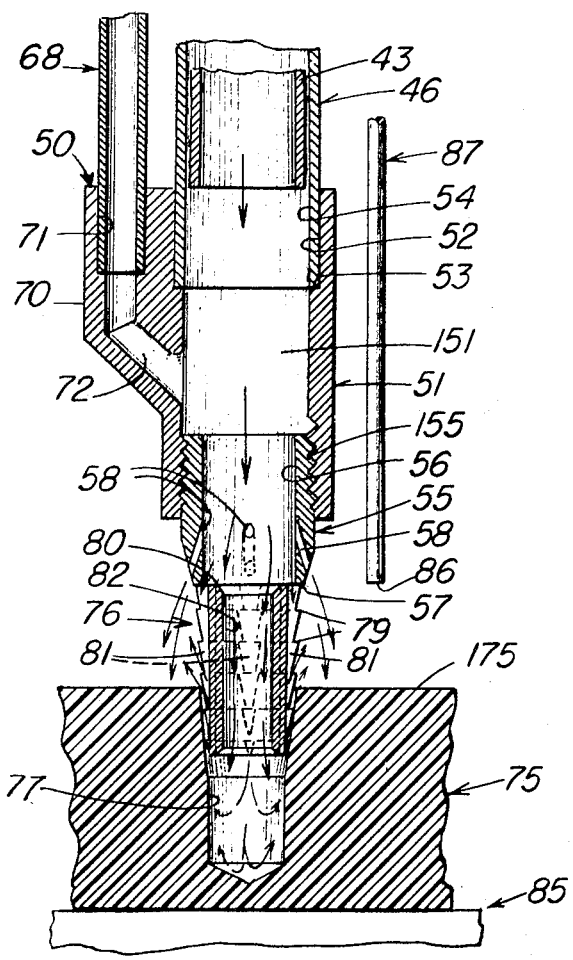

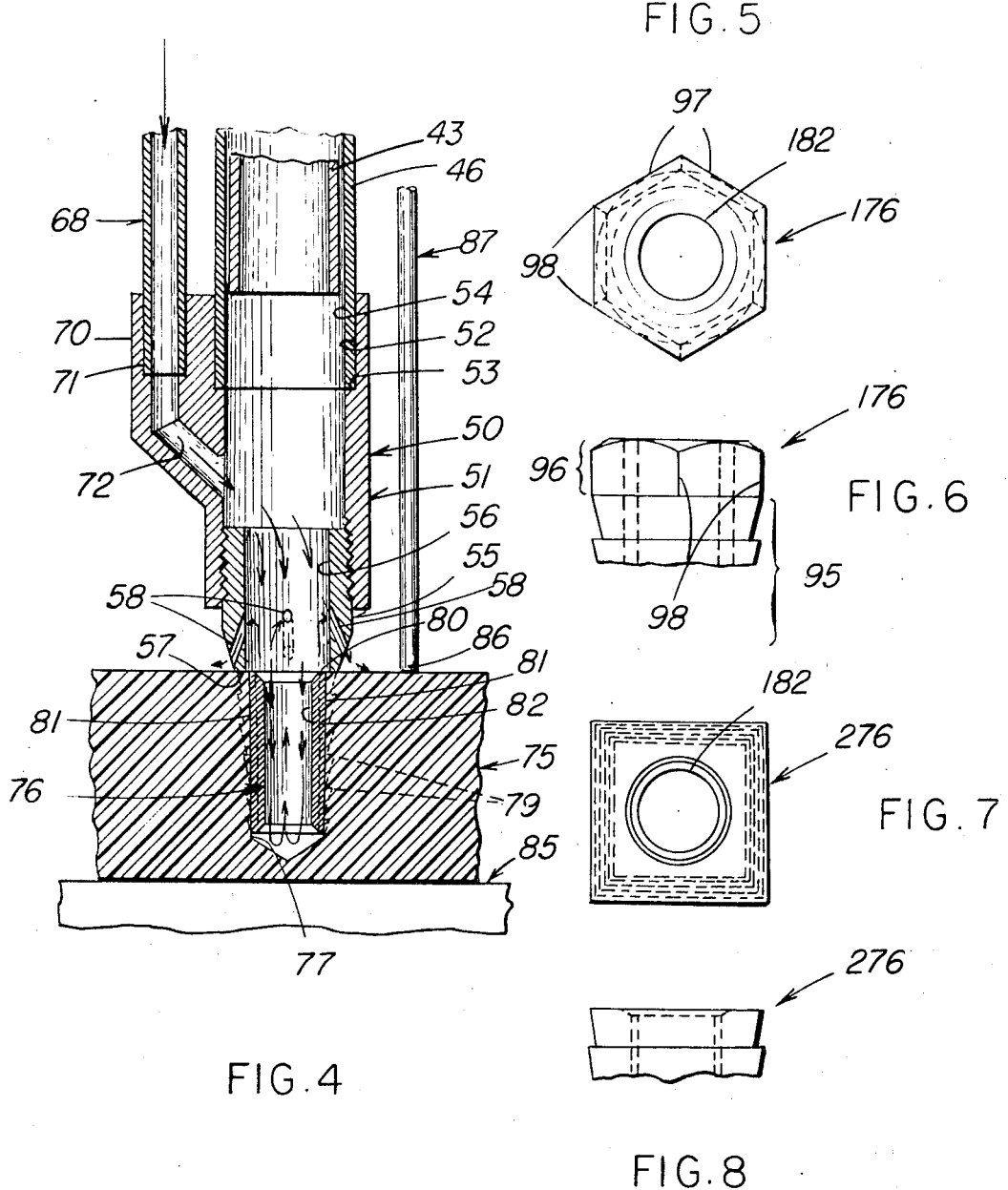

APPARATUS FOR UTILIZING HOT AND COOL GAS FOR THRUST EMBEDDING A METAL INSERT IN A BODY OF HEAT SOFTENABLE MATERIAL

BACKGROUND OF THE INVENTION

The present invention relates to the art of inserting and anchoring a metal insert in a body of plastic material, which may be a thermoplastic that is heat softenable to facilitate this action, by a method called "post molding."

The prior art has proposed different ways of accomplishing this end, such as the U.S. Pats. to Peterson No. 3,265,781 of Aug. 9, 1966 and U.S. Pat. to Balamuth et al. No. 3,184,353 of May 18, 1965.

In U.S. Pat. to Peterson No. 3,265,781 it is proposed to anchor one or more steel electrical contact screws that are dropped freely with close fits into sleeve holes provided through a thermoplastic, insulative baseplate. Each hole is surrounded by an integral sleeve boss that is relatively thin-walled and extends out through a hole in a conductive plate to be anchored to the insulative baseplate simultaneously with the anchorage of each screw within each sleeve boss. As pressure is applied to each inserted screw it is heated, such as by conduction from a heated tool, e.g., a soldering iron, or by resistance heating resulting from flow of electric current through the screw. The heating of the screw causes the sleeve boss to soften and the pressure applied causes the boss to mushroom so as to snug the softened plastic of the boss about the threads of the contact screw and to swell it over the edges of the boss-receiving hole in the conductive plate, for secure anchorage of these parts together following a relatively slow natural cooling to ambient temperature of the softened plastic. Such a procedure is unsuitable for employment in embedding metal inserts in thermoplastic bodies where a blind pilot hole is provided in the latter for initially inserting therein the smaller tip end of the insert that prevents electrical connection of a resistance heating circuit to opposite ends of the insert. Also heat conductive contact of a heated tool only to the outer end of the inset to heat the latter to a temperature high enough to soften enough of a large mass of the plastic that may be adjacent the ultimate site of the embedded insert, in absence of such a thin-walled boss, for progressive pressurized entry into the plastic, is unsatisfactory as a large amount of the heat from the insert will be dissipated in the large adjacent mass of the plastic body until after an undesirably long time this large mass has been brought up to the softening temperature while accommodating delay due to heat loss from the initially exposed back end section of the insert. Further, during such prolonged heating of the plastic material immediately adjacent the so heated insert a raising of the temperature of the latter to a degree that will assure the heat softening of this large adjacent mass of the plastic body hazards heat damage of the plastic immediately adjacent the entering insert.

In U.S. Pat. to Balamuth et al. No. 3,184,353 provision is made for progressive thrust of the insert into a thermoplastic body as the latter is heat softened at the site of the desired embedment. For this purpose the thrust ram has a socketed tip which receives the back end of the insert and this ram is vibrated at high frequency by complicated and expensive equipment to impart to the insert such vibrations. The resulting ultrasonic vibration of the insert while thrust is applied progressively to the latter causes softening of the thermoplastic adjacent the surfaces of insert to facilitate entry of the latter. When the insert is embedded to the desired depth the ultrasonic vibration thereof is terminated, and the softened plastic and embedded insert are permitted naturally to cool to the ambient temperature.

SUMMARY

The present invention avoids the difficulties and the special design of the parts for the finished product that is required by U.S. Pat. to Peterson No. 3,265,781, and the need for the expensive equipment demanded by Balamuth et al., while making provision for the ready addition of desirable improvements. Investment required by tools and equipment of this invention is but a fraction of the cost of other types of such metal insert thrust embedding machines that are presently available. Tool bulk size, weight thereof and the characteristic complexity of such are considerably less. The basic design of the tool of this invention can be embodied readily in manually operated, portable hand manipulated and fully automatic or semiautomatic versions. The rate of installation of inserts and the reliability of the results attained by practice of the present invention are desirably superior, while the strength of the resulting assemblies is at least equal to and at times greater than that of assemblies produced by other methods. Simultaneous installation of many inserts, and of different sizes if desired, by the ram of a single one of the tools of the present invention is easily accomplished, and single tool units can be readily manifolded properly to install simultaneously very closely located inserts. Versions of the present tool desirably are adaptable to commercially available automatic insert feeding mechanisms. Insert location presents no difficulty in attaining the desired installations since high and low insert receiving bosses of the thermoplastic bodies or those located close together and at different heights are easily accommodated, while those of the thin wall type will accept and effectively anchor inserts therein by practice of the present invention without undesirable bulging or cracking. Installation of inserts of large sizes by the present method and tools involves no problem since the characteristics of the heating and cooling equipment thereof permits ready provision of sufficient capacity of such equipment that will assure the required efficiency.

In practicing the method of the present invention each metallic insert is guided at the selected location on a face of the intended receptive body of heat softenable or thermoplastic material while forward thrust progressively is applied to the insert. Simultaneously hot pressurized gaseous medium, such as air, is fed to the insert and adjacent portions of body material with the temperature of this gaseous medium being controlled to assure maintenance of the body material heated thereby at a softening temperature that is below a temperature which will cause heat damage thereto. Thus embedding entry of the insert into the locally heat-softened body material progressively is attained by the applied thrust. After the insert has thus been embedded to the desired depth cooling pressurized gaseous medium, such as air, is fed in a similar manner to the embedded insert and adjacent heat-softened portions of the body material so as to chill them substantially to ambient temperature to rigidify the heat-softened body material for effecting secure anchorage of the embedded insert. The hot pressurized gaseous medium and the cooling pressurized gaseous medium preferably are fed at the proper times to the back end of the insert by common guiding means, such as by the thrust applying tip which, for this purpose, is hollow or tubular.

The basic tool structure that will perform this method of operation includes a tool body housing that is adapted to be supported during an installing operation in a relatively fixed position, such as by a suitable fixture or by hand. In this housing is mounted a thrust motor, e.g., a single-action spring return pneumatic motor, which has a forwardly extending thrust applying element that alternately may be thrust forward and retracted. This thrust applying element carries a subassembly that is movably supported in the forward end of the housing, and this subassembly includes a hollow installation tip having a forward insert-engaging nose that has an opening for delivering against the insert engaged thereby pressurized gaseous medium, such as air. Equipment is provided first to supply hot pressurized gaseous medium to the hollow tip so as to heat an engaged insert to a temperature that will soften the receiving body plastic material and thus allow progressive thrust entry of the insert, and then to supply to this hollow tip cooling pressurized gaseous medium so as to chill the heat-softened receiving material to an ambient rigidifying temperature after embedment of the insert. Means, e.g., the retracted thrust applying element of the thrust motor, then retracts the installation tip. The movable subassembly may have tubular means, housing controllable heating means, such as an electrical heating element, with intervening flow space, to supply pressurized gaseous medium therethrough to the hollow tip and to heat this medium to the desired hot temperature during flow therethrough, with this tubular means preferably connecting the motor thrust applying element to the tip for transmitting the thrust from the former to the latter. The movable subassembly also may embody a duct that is separate from the hot gaseous medium supply tubular means and is connectable to a source of cooling pressurized gaseous medium, with this duct preferably leading to the interior of the hollow tip. Also, preferably separate gaseous medium passages extend through the tool housing which respectively are connected to the duct and to the hot gaseous medium supply tubular means, and with the latter connection being located rearwardly of the heating means.

While the hot pressurized gaseous medium or air and the cooling pressurized gaseous medium or air may be desirably supplied to the interior of the hollow tip alternately, each with the complete exclusion of the other, this is not necessary in practical operations of the various embodiments of the tool. For example, in an operation requiring immediate successive installations of a plurality of inserts it may be desired to keep the heater energized to require a constant flow of air thereover in order to avoid any tendency of the energized heater coil from burning out while the cooling air is being fed periodically to the inserts as they are embedded. In such case the pressurized air that is kept constantly flowing through the heater may be supplied at a lower pressure than that which is periodically supplied as cool air to impose the chilling effect and thus bypasses the lower pressure air through the heater. The bypassing cooling air at the higher pressure overrides the lower pressure hot air as they are delivered together through the hollow tip, to impose a resultant cooling effect on the tip-engaged insert and adjacent heat-softened portions of the receiving plastic body. This, in effect, is an alternate supply of hot and cool air to each embedded insert.

BRIEF DESCRIPTION OF THE DRAWINGS

Other objects of the invention will in part be obvious and will in part appear from reference to the following detailed description taken in connection with the accompanying drawings, wherein like numerals identify similar parts throughout, and in which:

FIG. 1 is an axial section, with some parts broken away and others shown in side elevation, of an embodiment of the tool of the present invention, illustrating loose positioning of an insert in a pilot hole formed in a receiving thermoplastic body for guidance thereof and the surmounting on the back end of this insert of the tool in its initial position as readied for operation to embed the insert;

FIG. 2 is an enlarged, transverse sectional view taken substantially on line 2—2 of FIG. 1;

FIG. 3 is an enlarged axial section of the bottom portion of the tool, the piloted insert, and the portion of the receiving plastic body illustrated in FIG. 1, with parts broken away, and illustrating the parts in their relative initial positions before embedment of the insert while indicating flow of hot air against the latter and adjacent portions of the receiving plastic material in initiating the embedment;

FIG. 4 is a view similar to FIG. 3 with the illustrated parts being depicted in the final embedded position of the insert and indicating flow of cooling air against the insert and adjacent portions of the receiving plastic material;

FIG. 5 is an enlarged top view of another insert of the type illustrated in FIGS. 1, 3 and 4, which differs chiefly in the top section thereof;

FIG. 6 is a side elevational view, with the bottom portion broken away, of the insert illustrated in FIG. 5;

FIG. 7 is an enlarged top view of still another variant of the insert illustrated in FIGS. 1, 3 and 4; and FIG. 8 is a side elevational view, with the bottom portion broken away, of the insert illustrated in FIG. 7.

The insert installing tool, which is illustrated by way of example in FIGS. 1 to 4 incl., is of the manual type that is intended to be fixedly mounted by suitable fixture means, such as the frame and ram of a conventional drill press, or a specially designed installation apparatus, and it embodies the basic heating and cooling assembly which characterizes tools of the present invention. This illustrated tool is particularly intended for use in relatively low volume production that may be designed either to embed a single insert at a time or, with minor change in the design of the ram equipment thereof, to effect simultaneous multiple embedments. By way of illustration FIGS. 1 to 4 incl. depict the parts and operation of such a manual tool for embedding a single insert during each operational cycle.

The tool of FIGS. 1 to 4 incl. includes a tool body sleeve or housing 10 which will be suitably supported in a relatively fixed position by suitable fixture structure (not shown). As will be understood from FIG. 2 this housing preferably is of polygonal cross section, e.g., square, and the upper end thereof is closed by an inserted cap 11 of similar transverse shape, which may be anchored by a plurality of screws 12. In the upper section of the housing 10 is slidably mounted a thrust motor housing sleeve 13 which preferably is cylindrical in shape. This cylindrical support sleeve 13 fixedly carries at its top end a plug cap 14 which closes off this end, and it may be mounted in the cylindrical support sleeve by any suitable means, such as a press fit or a plurality of screws that may be arranged on radial axes indicated by the broken lines in the transverse plane 15. The plug cap 14 has an internally threaded, axial hole 16 in which is threadably engaged an externally threaded translating screw 17 with its shank at 18 rotatably supported through the square housing cap 11 in a manner preventing rearward axial shift. Top section 19 of the screw shank 18, which extends upwardly beyond the housing cap 11, carries, fixed thereto, a manual knob 20. As a result, with the tool housing 10 relatively fixedly supported, in a suitable fixture, the elevation of the cylindrical support sleeve 13 may be manually adjusted by rotating the manual knob 20, for either lowering or raising it to a generalized axial position, as may be desired.

A thrust motor 21 is supported within the cylindrical support sleeve 13, in a relatively fixed position, to be carried by the latter, such as by being press fitted therein or supported upon a bottom cap 22 which closes the bottom of this cylindrical support sleeve in a fixed manner.

The thrust motor 21 preferably is a single-action spring action pneumatic motor of conventional type having a piston (not shown) reciprocatively carried within the chamber 23 thereof for movement forward when pressurized air is supplied to the latter behind the piston. Preferably the pneumatic motor 21 is designed to have its piston retracted by valving of the supplied pressurized air from behind the piston to in front thereof, and for this purpose conventional, housed valving structure 24 is mounted upon the back end of the motor chamber 23. This piston motion reversing valve preferably is operated by a housed electrical solenoid 25, suitably connected by cables 26 into supply and control circuitry (not shown). The housed reversing valve 24 may be connected to a source of pressurized air by means of suitable supply hosing (not shown) and nipple 27. In order to permit the vertical adjustment of the cylindrical support sleeve 13 within the housing 10 the latter is suitably slotted at 28, and this nipple extends out through this slot for free longitudinal motion therein. Also the cylindrical support sleeve 13 may have a similar longitudinal slot 29 provided therein, in substantial alignment with the housing slot 28, for facilitating slidable mount of the pneumatic motor 21 therein before the nipple 27 is threadably mounted through these aligned slots into the side of the housed valve 24. These aligned slots 28 and 29 also provide an entry passage for the electrical supply cables 26 which lead to the housed solenoid unit 25 and for escape of exhaust air.

The forward or bottom end of the pneumatic cylinder 23 is equipped with the usual externally threaded packing gland hub 30 through which the piston stem 31 slidably extends. The packing gland hub threadably engages into an internally threaded axial hole in the bottom sleeve cap 22, and may be fixed therein by a setscrew 32.

The bottom section of the tool body housing 10 slidably carries therein a cylindrical heater sleeve 33 and preferably the bottom end of this tool housing is provided with an annular bearing 110 to guide this action. In the top section of the cylindrical heater sleeve 33 is mounted a sleeve cap and air manifold body 34. The top end of the heater sleeve 33 is enclosed by a cap plate 35 through which extends the upper end of an externally threaded sleeve 36. The bottom end of this sleeve 36 is threadably mounted in an internally threaded hole 37 that is axially located in the top end of the manifold body 34, and this sleeve may also have threadably mounted thereon the cap plate 35. The top end section of the externally threaded sleeve 36 may be provided with a plurality of longitudinal slots 38 (FIG. 2) to subdivide it into a plurality of resilient arcuate fingers 39, which initially may be splayed apart and thicker at their top edges than at the roots thereof to define therebetween a slightly tapered wall of a socket defined by the upper end of the sleeve bore to receive the forward end of the piston stem 31. An internally threaded nut 40, which is threadably mounted upon the resilient fingers 39, causes them, upon screwing elevation of the nut, to be sprung radially inward for clamping therebetween the front end of this piston stem 31, for connecting thereto the heater sleeve 33 for axial translation therewith.

The forward or bottom end of the manifold body 34 is abutted by an insulative sleeve 41 that supports the base 142 of an electrical heating unit 42. This electrical heating unit 42 may be of the superheating, continuous stream type that includes a tubular quartz envelope 43, in which is coaxially mounted a heating coil 44, and a through flow passage is provided by the sleeve 41, the hollow base of the heater unit 42 and this quartz envelope 43, so that when pressurized gaseous medium or air is flowed therethrough and over the heating coil 44 the temperature of this air is suitably elevated. For example, such superheating, continuous stream, electrical heater may be obtained in the open market as a 15 ohms standard unit No. DH116501 that is manufactured by Sylvania.

The bottom end of the cylindrical heater sleeve 33 is closed by a plug cap 45, fixedly mounted therein in any suitable manner, and the quartz envelope 43 and the heater coil 44 coaxially housed in the latter axially extend down through this closure cap. The quartz envelope 43 is surrounded by a tubular heater shield 46 which has its top end suitably anchored in this closure cap 46 by any suitable means, such as by three or more equally spaced set screws 47. The clamping of the tubular heater shield 46 to the cap 45 that closes the heater sleeve 33 is not intended to assure transmittal of any appreciable amount of thrust from the latter to the former, and provision for direct transfer of any such thrust preferably is made by a counterbored socket 48, surrounding the axial hole through which the quartz tube 43 extends on the forward side of the transverse closure structure of this closure cap, so as to receive therein the upper end 49 of the heater shield tube for abutment against the annular shoulder provided by this counterbore, thereby effecting direct transfer of thrust with minimal transfer of heat from the heater shield 46. The three or more setscrews 47 are intended merely to hold this tubular heater shield 46 in position with its upper end 49 telescoped into the socket 48 during upward retraction of the heater shield 33. This tubular heater shield 46 preferably is made of stainless steel so as to have appreciable strength for sustaining axial forces that are to be transferred thereby from the thrust motor piston stem 31 to the insert subassembly 50 that is carried by the lower end of this heater shield tube (FIG. 3).

The subassembly 50 includes a hollow sleeve 51 which is fixedly mounted on and preferably received in a counterbore 52 for abutting the lower end of this tubular heater shield against an annular, thrust-transferring shoulder 53 that is provided by the bottom of such counterbore. The hollow interior or chamber 151 of the subassembly sleeve 51 communicates with the bore 54 of the tubular heater shield 46. A hollow tip 55, which is preferably tubular, is mounted in the bottom end of the sleeve 51 and, as will be best understood from FIG. 3, it may be threadably mounted therein at 155 (for ready interchange of tips), with its through passage 56 communicating through the sleeve chamber 151 with the bore 54 of the tubular heater shield 46.

While in some embodiments it may be desired to make provision for temporary connection of the back end of an insert to be embedded in the softened thermoplastic body, to the tip 55 so as to serve as means for providing proper guidance of the insert, this is not necessary when other provision is made therefor, such as a pilot blind or through hole formed in the receiving thermoplastic body. In such case the thrust-applying tip 55 may terminate in a forward transverse nose 57 which will rearwardly engage the back end of the insert. The through passage 56 of the tip 55 is intended to direct flow alternately of hot pressurized gaseous medium or air and cooling pressurized gaseous medium or air against surfaces of the insert and, when the latter has a through bore, down through the latter into the pilot hole and against the wall surfaces thereof for heat transfer thereto and therefrom. The annular wall of the hollow tip 55 also preferably is provided with a plurality of apertures 58, which may be four in number and located at quarter points, to direct some of the flow of the pressurized gaseous mediums from the tip through passage 56 through the sidewall of the tip. Such apertures 58 may, if desired, be arranged obliquely as is indicated in FIGS. 1 and 3 to direct flow forwardly therefrom.

Since the subassembly sleeve 51 is intended alternately to deliver hot pressurized gaseous medium or air and cooling pressurized gaseous medium or air into the tip passage 56 the manifold body 34 is equipped with a pair of supply nipples 60 and 61 projecting from a side thereof that extend through holes in the side of the slidable cylindrical heater sleeve 33 (FIG. 1). These nipples 60 and 61 may be connected by suitable supply hosing to a source of pressurized air at ambient temperature, such as the supply chamber or storage tank of a conventional air compressor, respectively connected to the latter through suitable pressure regulating means for assuring, if desired, supply of pressurized air through the heater by way of nipple 60 at a lower pressure than that through a passage which is connected to nipple 61 and bypasses the heater. Accordingly, the sidewall of the tool casing 10 is provided with a longitudinal slot 62 through which these nipples extend, and with this slot permitting them freely to move forward and back therein with thrust and retraction of the slidable cylindrical heater sleeve 33. This slot 62 also permits entry of the conductors 63 of an electrical supply cable which may extend down past the manifold body 34 to the base unit 142 of the heater 42. For this purpose a longitudinal hole 64 may be provided through the heater sleeve cap plate 35 and the manifold body 34, or through a corner space in the casing radially outward of this cap plate and heater sleeve such as, for example, at the point "x," indicated at 65 in FIG. 2.

The flow passage through nipple 60 communicates with an axial passage 66 extending down through the manifold body 34 to communicate with the interior of the base sleeve 41 that has its back end abutting against the forward end of this manifold body and which communicates with the interior of the base unit 142 of the heater 42. Thus ambient air may be supplied therethrough for heating to the desired elevated temperature and ultimate delivery of the resulting hot pressurized air through the thrust-applying tip 55. The passage through the air supply nipple 61 communicates with a longitudinal passage 67 which, at its lower end, is counterbored to define a socket into which is press-fitted, in a fluidtight manner, the upper end of a longitudinally extending tube 68 which provides a delivery passage or duct for cooling pressurized air that is delivered thereinto through this nipple. The duct tube 68 extends forward through a longitudinal hole 69 which traverses the heater shield support cap or plug 45. The subassembly sleeve 51 is provided with a side boss 70 which has a counterbored entry passage 71 into which the forward end of the duct tube 68 is telescoped, and this passage communicates by an oblique bore 72 with the sleeve chamber 151. Thus a flow passage is provided between the cooling pressurized air supply nipple 61 to the passage 56 in the thrust-applying nipple 55 which bypasses the heater unit 42.

Let it be assumed that a thermoplastic body, a portion of which is indicated at 75, is to receive in a certain locality an insert 76. At this locality will preferably be provided a guidance blind hole 77 which is of somewhat less diameter than the illustrated tapered exterior of the insert 76, and with this blind hole having a flared mouth into which the front end section of this insert may be loosely dropped, as is illustrated in FIGS. 1 and 3. It is also indicated therein that this insert is provided with a plurality of annular stepped ribs 79 (FIGS. 3 and 4) which desirably progressively increase in diameter from the tip end to the enlarged rear end 80 of this insert. Also, at quarter points, this insert is provided with longitudinally extending grooves 81 for a purpose to be indicated later. Such insert 76 is also provided with a longitudinally extending and internally threaded axial bore 82, which is designed to receive an externally threaded stud for anchoring thereto any desirable element after this insert has been embedded in the thermoplastic body 75.

In operation of the illustrated embedding tool, and with its casing 10 supported in a relatively fixed position by suitable fixture means, the operator will drop the nose section of an insert 76 into the pilot hole 77 in the receiving thermoplastic body 75 and rest the latter upon a suitable fixed base member or plate, which is indicated in phantom at 85, with the insert top end 80 substantially aligned with the lifted nose 57 of the thrust-applying tip 55. The valve-manipulating solenoid 25 will then be energized by its electrical circuitry supply conductors 26 to manipulate the valve 24 to a position which will supply pressurized ambient air from the passage of the nipple 27 to behind the piston in the pneumatic cylinder 23 for forward thrust of the piston stem 31. This causes the cylindrical heater sleeve 33 to be lowered so that the nose 57 of the thrust-applying tip 55 will be seated upon the insert top end 80. The operator also manipulates control mechanism which energizes the heater coil 44 and causes pressurized ambient air to flow through the passage of the supply nipple 60, and thence down through the axial passage 66, the hollow sleeve 41 and heater base 142, and the heater tube or quartz envelope 43, for raising the temperature thereof as this air flows down through and over the heater coil 44 for flow of hot air through the subassembly sleeve chamber 151 and the bore 56 of the tip 55. The controls will have been adjusted so that the amount of heat supplied to this pressurized flowing air will quickly raise the temperature of the insert 76 and adjacent portions of the thermoplastic body 75 to a temperature that softens the thermoplastic without appreciable heat damage to the latter. This supply of hot pressurized air through the hollow tip 55 occurs while the application of thrust by the tip nose 57 to the insert back end 80 is continued. The hot pressurized air will be delivered down through the bore 82 and into the longitudinal grooves 81 of the insert 76 for raising the temperature of the latter to the desired degree. The hot pressurized air will also be delivered by the insert through bore 82 into the bottom of the pilot hole 77 for impingement against the sidewalls of the latter and then discharge out through the bottom portions of the longitudinal grooves 81, so as to soften the thermoplastic in the pilot hole walls for allowing the applied thrust progressively to advance the insert into this pilot hole. Some of the flowing pressurized hot air will also be delivered through the tip side apertures 58 to impinge upon the surface 175 of the receiving thermoplastic body in the vicinity of the insert for elevating the temperature thereof to a softening degree. In a period of about 1 to 5 seconds the heated insert will be progressively advanced into the softened thermoplastic flanking the pilot hole to the desired depth.

As this embodiment is being accomplished, which is illustrated in FIG. 4, the nose 86 of a feeler rod 84 contacts the top face 175 of the thermoplastic receiving body 75 so as to push this rod upward for causing it to manipulate by suitable means, such as a bracket arm 88 carried by the rod, the trigger 89 of a limit switch 90, for discontinuing or reducing, as desired, the flow of hot pressurized air and causing a substitute flow of cooling pressurized air and also, ultimately, to effect retraction or lift of the hollow tip 55 to its initial raised position of start for the next cycle of operation. The limit switch 90 may be carried by suitable bracket means upon the forward end of the slidable cylindrical heater sleeve 33 or the plug cap 45 mounted in the bottom end of this sleeve. The feeler rod 87 may be slidably guided in a longitudinal hole extending through the heater shield support cap or plug 45 and suitable biasing means, such as a compression spring 91 located between the bracket arm 88 and the bottom end of this cap or plug may be employed to return the feeler rod 87 to its initial lowered position for the recycling operation. The limit switch 90 and its operating mechanism are illustrated in the drawings merely by way of example, and various other types of limit switch mounts may be employed with suitable provision for adjustment of the location thereof so as to adapt the tool to embedding operation with respect to inserts of different lengths. It will be seen in FIG. 4 that in the embedded position of the insert 76, there depicted, the softened plastic has flowed into the longitudinal channels or grooves 81 and around and behind the plurality of annularly arranged, channel-interrupted ribs 79, so that when this softened plastic is cooled to rigidity rotation and withdrawal of the insert is resisted, for assuring secure anchorage of the embedded insert.

Immediately upon attaining the desired degree of embedment of the insert 76 within the localized softened portion of the receiving thermoplastic body 75 the flow of ambient air through the energized heater either may be terminated by suitable control means, such as upon manipulation of the limit switch 90, or reduced and overridden, and, if desired, the energization of the heater coil may be terminated simultaneously by the limit switch manipulation or reduced. At this time a large volume of pressurized ambient air will be supplied through the nipple 61 to flow down through the duct tube 68 into the interior of the subassembly support sleeve 51 and thence through the hollow tip 55, as is illustrated in FIG. 4. This cooling pressurized ambient air will enter the bore 82 of the embedded insert and the bottom end of the blind pilot hole 77 with flow thereof being reversed to discharge through the side apertures 58 of the tip. Thus the hot metal insert and the adjacent softened thermoplastic material of the receiving body 75 will be cooled in a fraction of a second to a temperature below the melting or softening temperature of the plastic, i.e., to a rigidifying temperature. The thrust-applying tip 55 may then be lifted away from the embedded insert 76 and the latter allowed to cool to the ambient temperature for attaining the desired secure anchorage of the insert in the thermoplastic body.

It has been found to be desirable in a cyclic operation for embedding a plurality of inserts in rapid succession to maintain the heating energization of the heater coil 44 while the cooling air is being delivered against each hot insert and the adjacent heat-softened plastic material in which it is embedded. As a measure of safety, it may be advisable in such case to avoid any possibility of the heater coil 44 burning out during the periods of delivery of cooling air, and this assurance may be attained by continuing the flow of ambient air through the continuously energized heater 42. This will require a temperature overriding effect of the pressurized cooling air in the subassembly chamber 151 and tip delivery passage 56, with respect to the heated air being continuously delivered thereinto through the heater 42 as the cooling air is also delivered thereinto through the bypass passage 72. Such overriding effect is attained by supplying ambient air to the heater supply nipple 60 at an appreciably lower pressure than that of the cooling ambient air which is supplied to the bypass nipple 61. This differential in pressure may be attained by supplying the ambient air to the nipples 60 and 61 through suitable pressure regulating means, such as a pressure regulator inserted in the supply line leading to the heater supply nipple 60. The resultant air mixture that is delivered through the tip passage 56 will be at a temperature below that which will soften the plastic material of the receiving body, or bodies, and low enough to assure a relatively rapid, resultant cooling effect on the tip-engaged insert and adjacent heat-softened portions of the receiving plastic material. This action, in effect, is an alternate supply of plastic-softening hot air and chilling or plastic-rigidifying cool air to each embedded insert and the adjacent plastic.

By way of illustration various types of inserts, other than that illustrated in FIGS. 1, 3 and 4, may be readily embedded by operation of the tool illustrated in FIGS. 1 to 4 incl. For example FIGS. 5 and 6 illustrate an insert 176 which has an internally threaded axial bore 182, which may be similar to the axial bore 82 of insert 76, and with the main leading section 95 thereof being somewhat similar, except for the omission of the longitudinal channels 81, in external contour to that of the insert 76. However, this main insert section 95 is surmounted by a back end section 96 which is provided, in lieu of the longitudinal channels, with means for preventing rotation of the embedded insert within the receptive thermoplastic body. For this purpose the back end section 96 is polygonally shaped in transverse contour, such as by being hexagonal, so that the side flats 97 and the intervening junction lips 98 will, when embedded in the cooled and rigidified thermoplastic that flowed to intimate contact therewith in the softened condition, desirably prevents the relative rotation of the embedded insert.

FIGS. 7 and 8 illustrate another design of insert 276 which may be embedded in a receiving thermoplastic body by operation of the tool of FIGS. 1 to 4 inclusive, and in this form it may be polygonal or square in transverse section on all planes while being stepped in a fashion similar to the stepping of the exterior of the insert 76. The insert 276 of FIGS. 7 and 8 may also be provided with an internally threaded axial bore 182. The polygonal shape of the transverse sections of this insert will, upon embedment in cooled rigidified thermoplastic, resist rotation in the latter.

It will be understood that while it is desirable to provide initially a guiding pilot hole, such as 77 in the thermoplastic body 75 where location of embedment of the insert is desired, this may be omitted provided the insert is of balanced shape and the abutment to its back end, which is preferably in a plane that is normal to its axis, of the tip nose 57, which is also preferably in a plane normal to the axis of the tip 55, are such as to assure proper guidance of the insert during entry that avoids canting thereof. Further, the pilot hole 77 may in certain installations be of the through type rather than in the form of a blind hole when such a through hole does not undesirably interfere with the design of the ultimate assembly, and such through hole will provide a useful discharge passage for flowing hot and cold pressurized air.

While the embodiment of the embedding tool that is illustrated in FIGS. 1 to 4 incl. is of the manual type it is to be understood that the basic assembly that is mounted in the fixture-supported housing thereof may be embodied in a hand manipulated "gun" type with the hand "gun" shell thereof supporting a similar basic assembly which is operated in similar fashion. This version of the tool may facilitate rapid installation of inserts in large or cumbersome thermoplastic receiving parts which could not be accommodated by stand types of machines. The basic tool assembly may also be embodied in a fully automatic machine which is designed for high volume output to satisfy maximum production requirements. Such a fully automatic machine would be controlled by a module which would be changeably programmed for a given installation environment, with particular regard to insert size, type of plastic, operating speed, and other factors characteristic thereof. Such a fully automatic machine would also be designed for including feeding mechanism and parts feeder equipment. A semiautomatic machine may embody the basic assembly of the present tool and designed for satisfying the demands of an average production where the cost of provision for automatic feeding of the parts and inserts might not be justified. A control module for such a semiautomatic machine would be simplified by replacing some portions of that which would satisfy the requirements of the operation of a fully automatic machine by provisions for manual operations, such as for initiating the installation sequence.

As to the heating of the insert and adjacent portions of the thermoplastic receiving body, the thrust embedment of an insert therein and the cooling of the softened plastic for secure anchorage of the embedded insert one should appreciate the following facts. Parts formed of thermoplastic materials, which are used in industry and are designed to have metallic inserts anchored therein for securement of other parts thereto, are of a wide variety of compositions. Since all thermoplastics may be used in the practice of the present invention and their molding temperatures, that are equivalent to their softening temperatures, are known or readily determined there is no problem in providing for the proper temperature of the hot pressurized gaseous medium or air which should be delivered by a particular tool of the present invention for softening a certain thermoplastic receiving body as a selected insert is progressively thrust embedded therein by such tool. By way of example, let it be assumed that the thermoplastic of the receiving body is to be an ABS type marketed by Uniroyal Chemical Co. under the trademark "Cralastic," class MM, and composed of acrylonitrile butadiene styrene, that has a molding temperature of about 350° F. to 425° F. In order to embed therein an insert of rather standard form and prevalent size that is made, for example, from brass in the shape depicted in FIG. 3, and having the dimensions of about 0.56 inch long, 0.38 inch OD and a threaded through bore of one-fourth inch diameter, the hot air should be of a temperature in that range. With a tool of the present invention it would take about two or three seconds to post mold or embed such insert in such thermoplastic to the full length of the insert, with the use of the pilot hole and practice of the present method, and less than one second to chill by the following blast of ambient or cooling air the softened thermoplastic to rigidity for attaining a secure mechanical grip of the embedded insert that is like that obtained by the prior conventional molding in procedure, so as to permit it efficiently to accommodate the intended in-service load that will be imposed by a part connected thereto with the use of a threaded stud threadably mounted in the insert bore.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subjects matter defined in the following claims.

1. An insert installing tool for embedding a metallic insert into a receiving body of heat softenable material which is relatively rigid at ambient temperatures characterized by
   1. a tool body housing adapted to be supported in a relatively fixed position during an installing operation;
   2. a thrust motor mounted in said housing and having forwardly extending thrust means;
   3. a thrust applying subassembly movably supported in the forward end of said housing and connected to said thrust means for forcible forward thrust by the latter, said subassembly having a. a hollow installation tip that has a forward insert-engaging nose provided with at least one opening to direct pressurized gaseous medium out of said tip against an insert rearwardly engaged by said nose;

b. means selectively to supply hot pressurized gaseous medium to the interior of said hollow tip at an elevated temperature which will heat an engaged insert to a temperature that softens the receiving body material without appreciable heat damage to the latter for facilitating thrust of the engaged insert into this material; and c. means alternatively to supply cooling pressurized gaseous medium to the interior of said hollow tip to chill the heat-softened receiving body material to a rigidifying temperature after the engaged insert has been embedded by the thrust into this softened material; and 4. means to retract said installation tip to disengage its nose from the embedded insert.

2. The installing tool as defined in claim 1 characterized by said installation tip retracting means being in the form of said motor which is of a type selectively to retract its forwardly extending thrust means.

3. The installing tool as defined in claim 1 characterized by said movable subassembly having tubular means to supply the hot pressurized gaseous medium to the interior of said hollow installation tip, and controllable heating means housed in said tubular means.

4. The installing tool as defined in claim 3 characterized by said tubular means being connected rearwardly to said motor thrust means and forwardly to said tip, and of sufficient rigidity to transfer the required thrust to the latter.

5. The installing tool as defined in claim 3 characterized by duct means embodied in said movable subassembly separate from said tubular means and connectable to a source of the cooling pressurized gaseous medium.

6. The installing tool as defined in claim 3 characterized by said heating means being in the form of a controlled electrical heating element coaxially supported in said tubular means with an annular gaseous medium flow space defined therebetween for forward delivery from said tubular means to said hollow tip of the hot pressurized gaseous medium.

7. The installing tool as defined in claim 6 characterized by said tubular means constituting an intervening connection between said motor thrust means and said tip with the latter supported on the front end of the latter, said tubular means being of sufficient rigidity as to transfer the required thrust to said tip, duct means embodied in said movable subassembly separate from said tubular means and leading to the interior of said hollow tip for supply to the latter of cooling pressurized gaseous medium, and separate gaseous medium passages extending through said tool body housing and respectively flow connected to the interiors of said duct means and tubular means with that for the latter communicating with its annular flow space rearwardly of said heating means.

* * * * *